United States Patent [19]
O'Brien

[11] Patent Number: 6,064,893
[45] Date of Patent: May 16, 2000

[54] MOBILE TELEPHONE SYSTEM

[76] Inventor: Orlin P. O'Brien, 9191 Main St., Whitmore Lake, Mich. 48189

[21] Appl. No.: 08/905,696

[22] Filed: Aug. 4, 1997

[51] Int. Cl.[7] ...................................................... H04Q 7/20
[52] U.S. Cl. ............................................................. 455/569
[58] Field of Search .................................... 455/569, 575, 455/149, 556, 345

[56] References Cited

U.S. PATENT DOCUMENTS

| | | | |
|---|---|---|---|
| 4,734,897 | 3/1988 | Schotz et al. | 369/2 |
| 5,243,640 | 9/1993 | Hadley et al. | 455/557 |
| 5,721,783 | 2/1998 | Anderson | 381/68 |
| 5,781,850 | 7/1998 | Ugge' et al. | 455/149 |
| 5,797,088 | 8/1998 | Stamenga | 455/345 |
| 5,867,794 | 2/1999 | Hayes et al. | 455/569 |

*Primary Examiner*—Daniel S. Hunter
*Assistant Examiner*—Myron K. Wyche
*Attorney, Agent, or Firm*—Alex Rhodes

[57] ABSTRACT

A mobile telephone system for aiding impaired hearing persons and others in overcoming the undesirable effects on incoming calls of ambient noises, such as engine, wind, road and traffic noises. The telephone system comprises a signal conditioning module for reducing feedback and amplifying signals received from a telephone handset, a vehicle entertainment system for amplifying and broadcasting incoming telephone calls and a pair of releasable interfaces. One of the interfaces releasably couples the signal conditioning module to a receiver portion of the handset. The second interface releasably couples an output of the signal conditioning module to a tape player of the vehicle entertainment system. In a second aspect of the telephone system, the signal conditioning module is releasably coupled to the vehicle entertainment system by a low power transmitter which is in series with the output of the signal conditioning module and an RF stage of a radio of the vehicle entertainment system. In a third aspect of the invention, the signal conditioning module is coupled to the vehicle entertainment system by a low power transmitter and a shielded cable having one end portion releasably connected to the signal conditioning module and an opposite end portion connected to an antenna socket of a radio of the vehicle entertainment system.

15 Claims, 4 Drawing Sheets

MOBILE TELEPHONE SYSTEM

FIELD OF THE INVENTION

This invention relates to mobile telephones and more particularly to improvements in portable mobile telephones for overcoming the undesirable effects on incoming calls of ambient noise.

BACKGROUND OF THE INVENTION

During recent years there has been a spectacular growth in the number of mobile telephones. Motor vehicles have become offices on wheels wherein individuals, businessmen and professionals such as, doctors and lawyers, manage their affairs and conduct their business. Moreover, portable mobile telephones have made it possible to conduct business at virtually any place and any time during the day. They have also increased safety by providing continuous communication to link persons equipped with portable telephones.

A serious problem with portable telephones is that incoming calls in motor vehicles are obscured by ambient noises, such as engine, wind, road and traffic noises. The problem is accentuated in hearing impaired persons. One consequence of this problem is that when operating the telephone, a driver's attention is diverted from the road. A contributing cause is that portable telephones are low power devices. Another cause is that portable telephones are provided with small earpieces. The ambient noise problem is expected to increase because of the increase in the number of vehicle and telephones and the desire to increase telephone portability by reducing their size.

SUMMARY OF THE INVENTION

A primary object of the present invention is to provide an economical and easy to implement means for solving the telephone ambient noise problem in motor vehicles. The present invention solves this problem by providing a non-invasive means for increasing the incoming call to ambient noise signal ratio by connecting a portable telephone to a vehicle entertainment system. A further benefit of the invention is that a trained technician is not required to connect the portable telephone to the entertainment system. A still further benefit is that neither special tools nor training are required to utilize the invention.

A still further benefit is that a portable telephone can be easily converted into a "hands free" telephone. A still further benefit is that common parts can be used for most vehicles. A still further benefit is that communications are improved with hearing impaired persons. A still further benefit is that vehicle passengers can actively participate in conference calls.

The invention resides in certain features which individually and collectively contribute to its ability to easily and economically adapt an existing portable telephone to a vehicle entertainment system. The invention broadly comprises a conventional portable telephone; a pair of releasable non-invasive interfaces; a signal conditioning module; and a vehicle entertainment system. The vehicle entertainment system comprises a usual type audio cassette tape player and radio.

Further benefits and features of the invention will become apparent from the ensuing detailed description and drawings which describe the invention and manner of using the invention.

DETAILED DESCRIPTION OF THE PREFERRED EMBODIMENT

Figure 1:
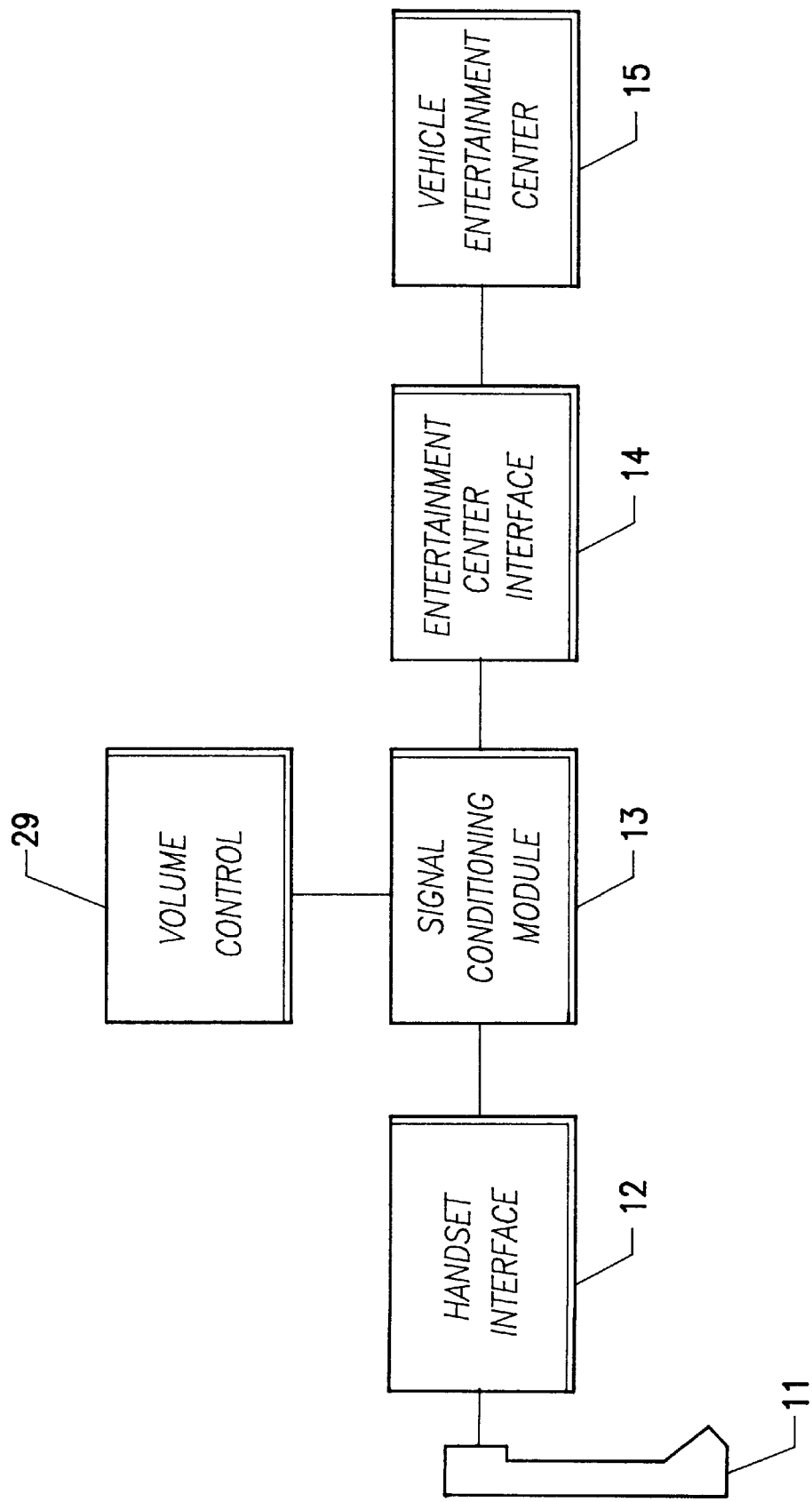
FIG. 1 is a block diagram of a mobile telephone system according to the invention.

Referring now to the drawings wherein like numerals designate like and corresponding parts throughout the several views, a first embodiment of a portable telephone system, designated by the numeral 10, is shown in diagrammatic form for purposes of describing the invention.

The portable telephone system 10, is comprised of a conventional mobile telephone handset 11, a handset interface 12, a signal conditioning module 13, a vehicle entertainment system interface 14, and a vehicle entertainment system 15. One important feature of the invention 10 is that the interfaces 12, 14 which connect the handset 11 to the vehicle entertainment system 15 are non-invasive, i.e., they neither require changes to a vehicle, the handset 11, or entertainment system 15.

The entertainment system 15 is conventional and includes a cassette tape player 16, a radio 17, and a loud speaker 18. The tape player 16 and radio 17 are mounted in a housing 19 and share an audio amplifier 20 and a loud speaker 18.

Figure 2:
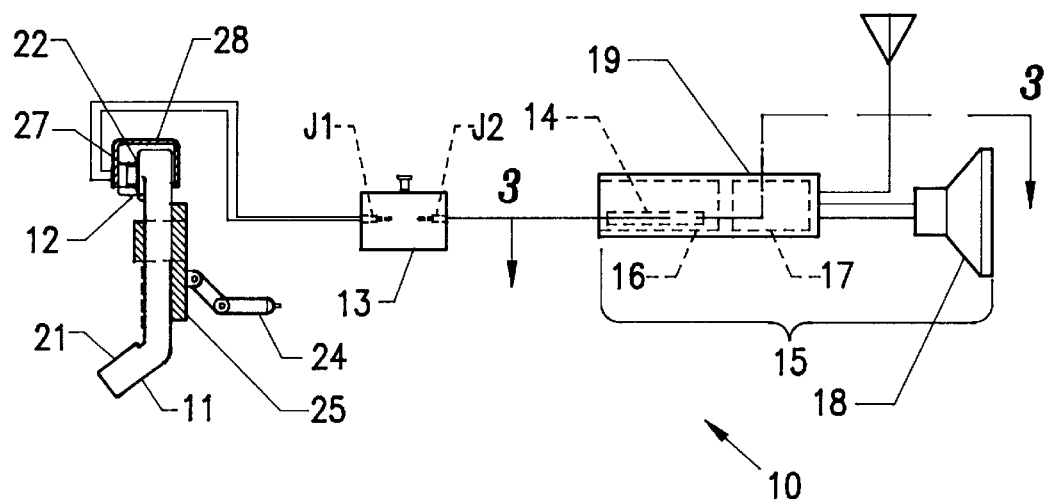
FIG. 2 is a diagrammatic drawing of a first embodiment of the invention.
Figure 4:
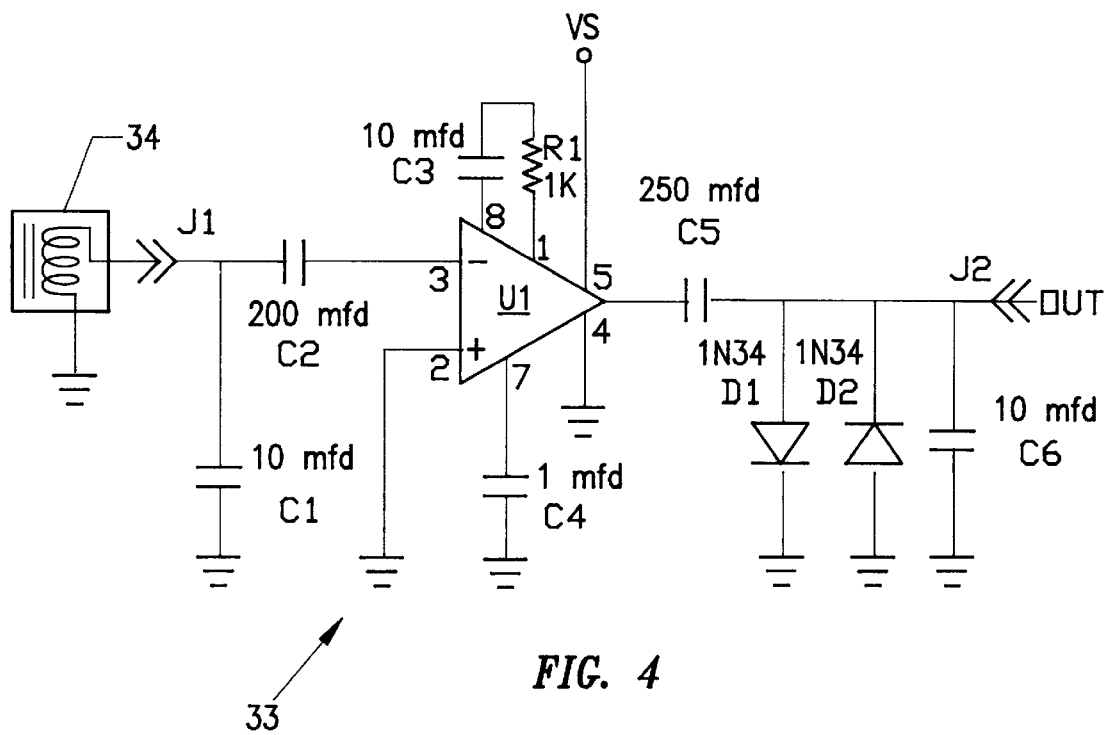
FIG. 4 is a schematic diagram of a signal conditioning module.
Figure 5:
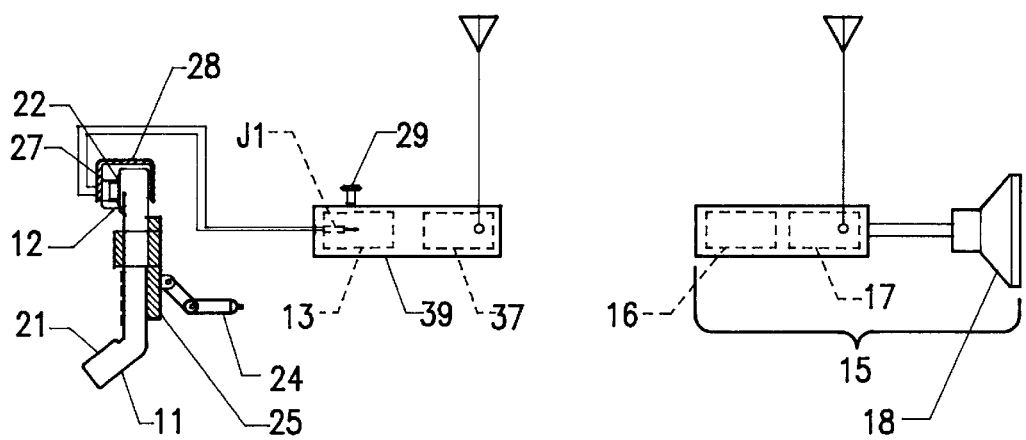
FIG. 5 is a diagrammatic drawing of a second embodiment of a mobile telephone system according to the invention.
Figure 6:
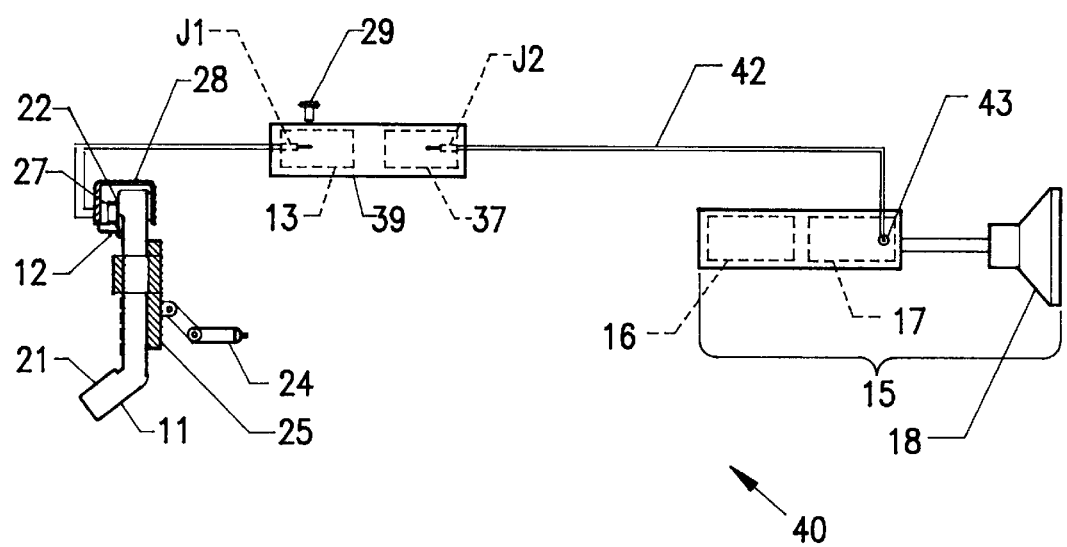
FIG. 6 is a schematic drawing of a third embodiment of a mobile telephone system according to the invention.

Referring to FIG. 2, the numeral 21 designates the handset's mouthpiece portion, commonly referred to as a transmitter; the numeral 22 designates the handset's earpiece portion, commonly referred to as a receiver 22; and the numeral 23 designates a bracket for releasable supporting the telephone handset 11 on a vehicle interior (not shown) during a "hands free" operation. 24 is an adapter for engaging a usual socket (not shown) for a cigar lighter for supplying power and to charge a battery in the interior of the handset 11.

The signal conditioning module interface 12 consists of the receiver 22 and a pick-up coil 27 releasably mounted on the receiver 22 with a channel shaped bracket 28, for coupling the receiver 22 with the signal processing module 13. Since most receivers 22 are electromagnetic type receivers, the pick-up coil 27 will be adequate in most cases. However, the pick-up coil cannot be used for electrostatic types, such as electret receivers (not shown). In such cases, a small microphone (not shown) can be releasably mounted to the receiver 22 in lieu of the pick-up coil 27. The electrical output signals of the pick-up 20 are fed to the signal conditioning module 13 at jack J1.

During the development of the invention, a prototype signal conditioning module 33 was constructed and tested. During tests, several problems were identified and corrected. One problem was that for incoming calls to be heard, the volume of the vehicle entertainment system had to be set at a high level. This caused locally generated DTFM (dual-tone frequency) dialing to be objectionably loud. Also, when the handset 11 was disconnected from the entertainment system 14, previously tuned radio station signals returned at objectionably high levels. This problem was solved by providing an amplifier stage which allowed incoming calls to be comfortably heard without the necessity of changing the volume setting of the entertainment system and of limiting DTFM tones to a similar level.

Another problem which arose was that a regenerative feedback loop was created by the handset's transmitter 21, the telephone's side tone circuit (i.e. the circuit which allows a person to hear himself talk when using a telephone), the amplifier 20 and the speaker 18. When the transmitter 21 was held close to the speaker 18 or the volume was increased past a critical point, an objectionable squeal was produced.

Since, the regenerative feedback loop produced a high pitched squeal and the bulk of the intelligence in a voice signal is relatively low in pitch, it was possible to solve the latter problem by selectively shunting higher frequencies above intelligible speech, i.e. about 3000 Hz to 4000 Hz, to ground while passing lower frequencies through to a limiting amplifier to minimize the effects of the regenerative feedback loop.

Figure 3:
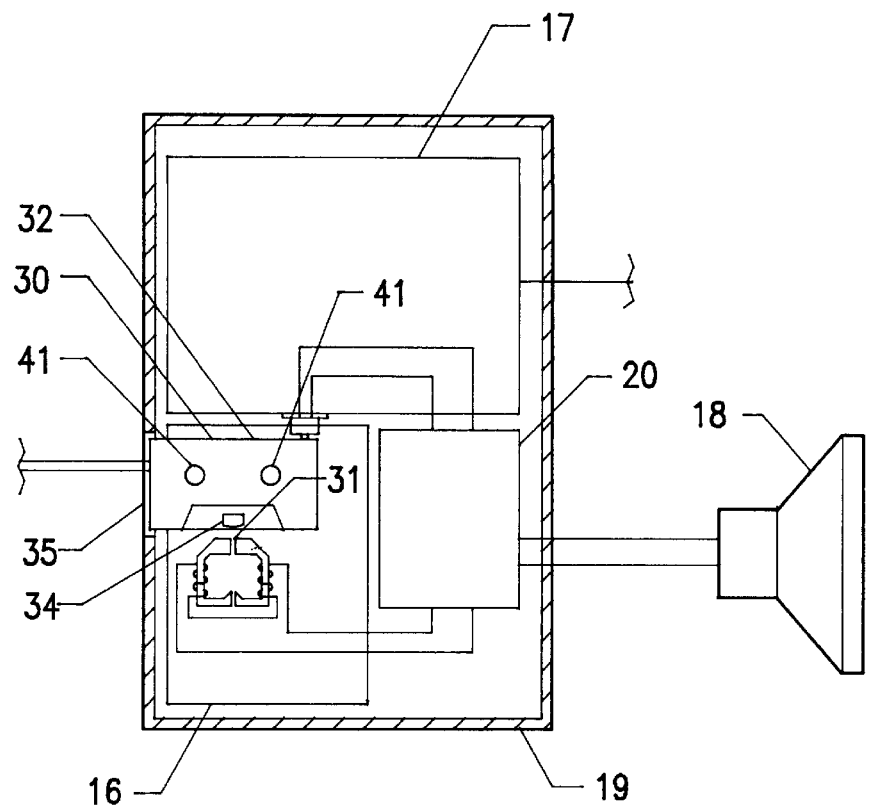
FIG. 3 is a cross-sectional view taken on the line 3—3 in FIG. 2.

The circuit of the final prototype signal conditioning module is shown in FIG. 3. The output of a pick-up 34 coil is brought in at jack J1. An input filter consisting of capacitors C1 and C2 and the 5 kilohm internal resistor at the output of the LM-836 audio amplifier U1, shunt frequencies above approximately 3000 Hz to ground while passing lower frequencies to the audio amplifier U1 for amplification. The gain of amplifier U1 is variable from 20 to 200 by varying the resistance and capacitance connected between pins 1 and 8 of amplifier U1. The network capacitor C3 and resistor R1 set the gain of approximately 50.

The output of amplifier U1 has a quiescent offset voltage of about one-half the applied voltage and capacitor C5 blocks this DC voltage while passing the amplified audio signal to the DTFM limiting network consisting of diodes D1, D2 and the input impedance of the entertainment system 15 which is connected to the output jack J2. D1 and D2 are geranium diodes and have a forward biased voltage drop of 200 millivolts. Diodes D1 and D2 are connected between the amplifier's output and ground in opposite polarities, limiting the output voltage to 400 millivolts peak-to peak for both voice and DTFM dialing. The signal conditioning module 13 may also include a volume control 29 to allow a user to adjust the level of an incoming call.

Capacitor C6 acts as a smoothing filter to reduce the harshness of the clipped audio signal and acts in conjunction with capacitor C5 and the input impedance of the entertainment system 15 to attenuate frequencies above 3000 Hz. Capacitor C4 is a power supply filter for reducing a vehicle's alternator and ignition EMI (electro-magnetic interference) when the unit is powered by the car's battery. The prototype was powered by a 9 volt battery connected between pins 4 and 6 of amplifier U1. The signal conditioning unit 33 was mounted in a metal box with all input, output and power wires twisted to reduce EMI from portable telephone RF (radio frequency).

Referring now to FIG. 1, the entertainment system interface 14 which couples the signal conditioning module 13 to the cassette tape player 16, consists of a cassette adapter 30 and a player head 31 of the cassette tape player 16. The cassette adapter 30 is of a similar type which is used for connecting compact audio disk players to cassette tape players of vehicle entertainment systems. This type of adapter is disclosed in Schotz U.S. Pat. No. 4,734,897 which is incorporated herein by reference. The cassette adapter is connected to the signal conditioning module by a mini phone jack J2 and comprises a housing 32 having a configuration which is substantially the same as the housing of a conventional audio tape, a pair of apertures 41 for receiving the usual reeldrive spindles, and a record head 34 for contacting the usual player head 31 of the cassette tape player 16. When the cassette adapter 30 is inserted through an opening 35 in the front of the housing 19 loader 21 the RF circuits of the radio 17 are de-coupled in the usual manner from the entertainment system's audio amplifier 20 thereby amplifying only an incoming telephone call.

Referring now to FIG. 2, an alternate embodiment generally designated by the numeral 36 is shown having a low power transmitter 37 in series with the signal conditioning module 13 in a common housing 39. The transmitter 37, which is tuned to an unused broadcast frequency, is modulated by the output of a pick-up coil 27. The output of the transmitter 37 is picked up by an RF stage of the radio 17, which is tuned to the same frequency as the transmitter 37, and is demodulated and amplified in the usual manner.

In FIG. 3, a third embodiment, generally designated by the numeral 39, is shown wherein the RF output of the transmitter 37 is fed directly with a shielded cable 42 to an antenna socket 43 of the radio 17. One advantage of this embodiment 39 is that the radio 17 need not be tuned to an unused broadcast frequency since a detachment of the usual antenna prevents FM or AM broadcast signals from interfering with incoming telephone calls.

From the foregoing it will be appreciated that my invention is a mobile telephone system for eliminating interference with incoming calls. Moreover, the invention can be easily and economically assembled by persons who are not trained telephone installers. It will also be appreciated that my invention provides numerous other benefits and advantages.

Although only several embodiments of my invention have been disclosed, it will be understood that other embodiments can be derived by obvious substitution of parts as well as changes in shape, materials and arrangements of parts without departing from the spirit thereof.

I claim:

1. In a mobile telephone system which is intended to be used in a motor vehicle, said telephone system having a handset for making and receiving telephone calls, said handset having a transmitter portion and a receiver portion, the improvement comprised of: a first releasable non-invasive interface mounted on said handset for operatively coupling incoming and outgoing telephone calls from said handset to a signal conditioning module, said releasable non-invasive interface having an electrical output which varies in frequency in accordance with the audio frequency of incoming and outgoing telephone calls; a signal conditioning module for receiving, amplifying and filtering said output of said first releasable non-invasive interface; a second non-invasive releasable interface for operatively coupling an output of said signal conditioning module to an audio cassette tape player of a vehicle entertainment system; and a vehicle entertainment system for receiving, amplifying and broadcasting said output of said signal conditioning module.

2. The improvement as recited in claim 1 wherein said first releasable non-invasive interface comprises a pick-up coil releasably mounted on said receiver portion.

3. The improvement as recited in claim 1 further comprising a bracket for releasably mounting said handset to a vehicle interior for "hands free" operation of said telephone.

4. The improvement as recited in claim 2 wherein said first releasable interface comprises a small microphone releasably mounted on said handset's receiver portion.

5. The improvement as recited in claim 1 wherein said signal conditioning module includes a means for eliminating a high pitch squeal caused by an objectionable feedback by filtering out audio frequencies of about 3000 Hz to 4000 HZ.

6. The improvement as recited in claim 1 wherein said signal conditioning module includes an amplifier stage for preventing the sound level of DTFM dialing to be objectionably high, said amplifier producing a gain in amplitude of said output of said first interface of approximately 50.

7. The improvement as recited in claim 1 wherein said second interface comprises a cassette adapter having a housing which is configured substantially the same as a conventional tape cassette and a record head; and a playback head of said cassette tape player.

8. The improvement as recited in claim 1 wherein said signal conditioning module further comprises a control for selectively adjusting the volume of incoming telephone calls.

9. The improvement as recited in claim 1 further comprising a low power transmitter in series with an output of said signal conditioning module.

10. The improvement as recited in claim 9 wherein said entertainment system comprises a radio and said second interface for releasably coupling said signal conditioning module to said vehicle entertainment system comprises said transmitter and an RF stage of said radio.

11. In a mobile telephone system which is intended to be used in a motor vehicle for making and receiving telephone calls, said telephone system having a handset, said handset having a transmitter portion and a receiver portion, the improvement comprised of: a vehicle entertainment system; a first releasable non-invasive interface mounted on said handset for operatively coupling incoming and outgoing telephone calls from said handset to a signal conditioning module, said signal conditioning module having a means for eliminating a high pitch squeal caused by an objectionable feedback and a means for preventing the sound level of DTFM dialing to be objectionably high; and a second releasable non-invasive interface for operatively coupling an output of said signal conditioning module to said vehicle entertainment system.

12. In a mobile telephone system which is intended to be used in a motor vehicle in combination with a vehicle entertainment system for making and receiving telephone calls, said telephone system having a handset, said handset having a transmitter portion and a receiver portion, the improvement comprised of: a vehicle entertainment system; a first releasable non-invasive means mounted on said handset for operatively coupling incoming and outgoing telephone calls from said handset to a signal conditioning module; a signal conditioning module for eliminating a high pitch squeal caused by an objectionable feedback from said vehicle entertainment system and a means for preventing the sound level of DTFM dialing to be objectionably high; and a second releasable non-invasive means for operatively coupling an output of said signal conditioning module to said vehicle entertainment system.

13. In a mobile telephone system which is intended to be used in combination with a vehicle entertainment system in a motor vehicle for making and receiving telephone calls, said telephone system having a handset, said handset having a transmitter portion and a receiver portion, the improvement comprised of: a first releasable non-invasive interface mounted on said handset for operatively coupling incoming and outgoing telephone calls from said handset to a signal conditioning module; a signal conditioning module for receiving electrical signals from said first releasable interface which vary in accordance with an audio frequency of incoming telephone calls, said signal conditioning module having an audio amplifier and a filter network for filtering out signals from said signals which are received from said first interface having a frequency above approximately 3000 Hz to 4000 Hz and for preventing the sound level of DTFM dialing to be obiectionably high; a second releasable non-invasive interface for releasably coupling an output of said signal conditioning module to a vehicle entertainment system; and a vehicle entertainment system for amplifying and broadcasting said output of said signal conditioning module.

14. The improvement as recited in claim 13 wherein said vehicle entertainment system comprises a cassette tape player and a radio and said signal conditioning module is coupled to said cassette tape player of said vehicle entertainment system.

15. The improvement as recited in claim 13 further comprising a low power transmitter connected in series with said output of said signal conditioning module and said second releasable interface comprises said transmitter and an RF stage of said radio.

* * * * *